US012692455B2

(12) United States Patent
Hiratsuka et al.

(10) Patent No.: US 12,692,455 B2
(45) Date of Patent: Jul. 28, 2026

(54) REFRIGERATION CYCLE DEVICE AND COMPRESSOR

(71) Applicant: Mitsubishi Electric Corporation, Tokyo (JP)

(72) Inventors: Kengo Hiratsuka, Tokyo (JP); Manami Nakamura, Tokyo (JP); Kenji Kojima, Tokyo (JP); Satoru Toyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 514 days.

(21) Appl. No.: 18/274,212

(22) PCT Filed: Feb. 9, 2021

(86) PCT No.: PCT/JP2021/004724
§ 371 (c)(1),
(2) Date: Jul. 26, 2023

(87) PCT Pub. No.: WO2022/172314
PCT Pub. Date: Aug. 18, 2022

(65) Prior Publication Data
US 2024/0110119 A1 Apr. 4, 2024

(51) Int. Cl.
*C10M 129/24* (2006.01)
*C09K 5/04* (2006.01)
(Continued)

(52) U.S. Cl.
CPC ........... *C10M 129/24* (2013.01); *C09K 5/044* (2013.01); *C10M 105/38* (2013.01); (Continued)

(58) Field of Classification Search
CPC ............ C10M 129/24; C10M 2207/08; C10M 2207/2835; C10M 2207/024;
(Continued)

(56) References Cited

U.S. PATENT DOCUMENTS

2012/0322706 A1* 12/2012 Matsumoto .......... C10M 169/04 508/440
2019/0233698 A1* 8/2019 Yana Motta ........... C09K 5/044
(Continued)

FOREIGN PATENT DOCUMENTS

JP 2009-298918 A 12/2009
JP 2010-159310 A 7/2010
(Continued)

OTHER PUBLICATIONS

International Search Report and Written Opinion mailed on Apr. 13, 2021, received for PCT Application PCT/JP2021/004724, filed on Feb. 9, 2021, 11 pages including English Translation.
(Continued)

*Primary Examiner* — Emmanuel E Duke
(74) *Attorney, Agent, or Firm* — XSENSUS LLP

(57) ABSTRACT

A refrigeration cycle device comprises a refrigerant, a compressor that compresses the refrigerant, and a refrigerating machine oil that lubricates a sliding part of the compressor. The refrigerant includes trifluoroiodomethane. The refrigerating machine oil includes a base oil and a quinone additive. The quinone additive is at least one selected from the group consisting of 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, 2-hydroxy-1,4-naphthoquinone, and 1,4-anthraquinone.

8 Claims, 4 Drawing Sheets

(51) Int. Cl.

| | |
|---|---|
| ***C10M 105/38*** | (2006.01) |
| ***F25B 31/00*** | (2006.01) |
| *C10N 30/06* | (2006.01) |
| *C10N 30/10* | (2006.01) |
| *C10N 40/30* | (2006.01) |

(52) U.S. Cl.
CPC ...... *F25B 31/002* (2013.01); *C09K 2205/122* (2013.01); *C09K 2205/24* (2013.01); *C10M 2207/08* (2013.01); *C10M 2207/2835* (2013.01); *C10N 2030/06* (2013.01); *C10N 2030/10* (2013.01); *C10N 2040/30* (2013.01)

(58) Field of Classification Search
CPC ...... C10M 2207/025; C10M 2207/026; C10M 2207/042; C10M 2223/041; C10M 171/008; C09K 5/0441; C09K 2205/122; C09K 2205/24; C09K 5/04; F25B 31/002; F25B 2400/121; F25B 2500/16; F25B 31/026; C10N 2030/06; C10N 2030/10; C10N 2040/30; C10N 2020/101; C10N 2030/12; F04C 23/008; F04C 18/356; F04C 2210/26; F04C 2240/40
See application file for complete search history.

(56) References Cited

U.S. PATENT DOCUMENTS

| | | | | |
|---|---|---|---|---|
| 2020/0208882 | A1* | 7/2020 | Ota | F25B 31/002 |
| 2020/0326110 | A1* | 10/2020 | Asano | C09K 5/045 |
| 2020/0411251 | A1* | 12/2020 | Takatani | C08K 5/08 |
| 2021/0269692 | A1* | 9/2021 | Ota | F24F 1/0007 |

FOREIGN PATENT DOCUMENTS

| | | | | |
|---|---|---|---|---|
| JP | 2011-057885 | A | 3/2011 | |
| JP | 6545337 | B1 | 7/2019 | |
| JP | 6545338 | B1 | 7/2019 | |
| JP | 2020-034260 | A | 3/2020 | |
| JP | 6976494 | B1 * | 12/2021 | F04C 23/008 |

OTHER PUBLICATIONS

Chinese Office Action issued Mar. 28, 2025, in corresponding Chinese Patent Application No. 202180092977.9, 11pp.

Chinese Office Action issued Nov. 29, 2024, in corresponding Chinese Patent Application No. 202180092977.9, 11pp.

* cited by examiner

REFRIGERATION CYCLE DEVICE AND COMPRESSOR

CROSS-REFERENCE TO RELATED APPLICATION

The present application is based on PCT filing PCT/JP2021/004724, filed Feb. 9, 2021, the entire contents of which are incorporated herein by reference.

TECHNICAL FIELD

The present disclosure relates to a refrigeration cycle device and a compressor.

BACKGROUND ART

For the prevention of global warming, various measures against climate change have been reported internationally. In order to comply with the Montreal Protocol and other refrigerant regulations, practical application of low-GWP refrigerants is proceeding.

Refrigerants used for refrigeration cycle devices are being replaced by refrigerants with lower global warming potentials (GWP) than that of R-410A, which has been mainly used in the past. Note that R-410A is a mixed refrigerant in which 50% by mass of R-32 (difluoromethane) and 50% by mass of R-125 (pentafluoroethane) are mixed, and the GWP of R-410A is 2088.

Examples of the low-GWP refrigerant composition that can serve as an alternative to R-410A include a lower flammable (Class 2L according to the ANSI/ASHRAE Standard 34-2019) refrigerant such as R-32 (GWP=675) and R-1234yf (GWP<1), and a higher flammable (Class 3 according to the ANSI/ASHRAE Standard 34-2019) refrigerant such as R-290 (GWP=3). Meanwhile, in addition to having a low GWP, it is desirable for the refrigerant to have low flammability from the viewpoint of safety.

Meanwhile, R-466A, a refrigerant released in June 2018, has a GWP of 733, which is lower than the GWP of R-410A, and is classified as non-flammable (Class 1) according to the ANSI/ASHRAE Standard 34-2019.

R-466A is a mixed refrigerant of R-32, R-125, and R-13I1 (trifluoroiodomethane, $CF_3I$). The mixing proportions of R-32, R-125, and R-13I1 are 49.0% by mass (composition tolerance: +0.5/−2.0), 11.5% by mass (composition tolerance: +2.0/−0.5), and 39.5% by mass (composition tolerance: +2.0/−0.5), respectively.

Patent Literature 1 (Japanese Patent No. 6545337) and Patent Literature 2 (Japanese Patent No. 6545338) disclose refrigeration cycle devices in which R-466A is used as a refrigerant.

CITATION LIST

Patent Literature

PTL 1: Japanese Patent No. 6545337
PTL 2: Japanese Patent No. 6545338

SUMMARY OF INVENTION

Technical Problem

However, in R-13I1 included in R-466A, the C—I bond is thermally unstable. Therefore, under a high-temperature environment, the C—I bond is cleaved to produce a trifluoromethyl radical ($CF_3\cdot$) and an iodine radical ($I\cdot$).

The produced trifluoromethyl radical and iodine radical react with a hydrogen atom and moisture in the refrigerating machine oil to produce methane trifluoride ($CHF_3$) and hydrogen iodide (HI). Metal members in the refrigeration cycle device react with methane trifluoride and hydrogen iodide, which accelerates deterioration.

Accordingly, there has been a possibility that the use of a refrigerant including R-13I1 in a refrigeration cycle device that comprises a compressor designed on the premise of using conventional R-410A, R-32, or the like, for example, would reduce the durability of the metal members, and thus would make it impossible to ensure the long-term reliability of the refrigeration cycle device.

Especially in the compressor, the heat generated by the motor results in a high temperature, which tends to cause thermal decomposition of R-13I1 (cleavage of the C—I bond). Therefore, especially the metal members of the compressor are more susceptible to deterioration than the other metal members in the refrigeration cycle device. Note that, among the metal members of the compressor, especially a neodymium magnet is more easily deteriorated or deformed by methane trifluoride and hydrogen iodide compared to other metallic materials.

In view of the problem described above, an object of the present disclosure is to provide a refrigeration cycle device and a compressor that can ensure reliability over a long period of time even when using a refrigerant including trifluoroiodomethane ($CF_3I$: R-13I1).

Solution to Problem

A refrigeration cycle device according to the present disclosure comprises a refrigerant, a compressor that compresses the refrigerant, and a refrigerating machine oil that lubricates a sliding part of the compressor.

The refrigerant includes trifluoroiodomethane.

The refrigerating machine oil includes a base oil and a quinone additive.

The quinone additive is at least one selected from the group consisting of 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, 2-hydroxy-1,4-naphthoquinone, and 1,4-anthraquinone.

In addition, a compressor according to the present disclosure is a compressor used for a refrigeration cycle device.

The refrigeration cycle device comprises a refrigerant that includes trifluoroiodomethane.

The compressor includes a refrigerating machine oil for lubricating a sliding part of the compressor.

The refrigerating machine oil includes a base oil and a quinone additive.

The quinone additive is at least one selected from the group consisting of 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, 2-hydroxy-1,4-naphthoquinone, and 1,4-anthraquinone.

Advantageous Effects of Invention

According to the present disclosure, even when using a refrigerant including trifluoroiodomethane ($CF_3I$: R-13I1), the above specific quinone additive added to the refrigerating machine oil can capture the decomposition products of trifluoroiodomethane, thereby suppressing deterioration of the metal members (especially neodymium magnet) due to methane trifluoride and hydrogen iodide, and thus a refrigeration cycle device and a compressor can be provided that can ensure reliability over a long period of time.

DESCRIPTION OF EMBODIMENTS

A refrigeration cycle device and a compressor according to embodiments of the present disclosure will be described with reference to the drawings. Note that the present disclosure is not limited only to the following embodiments, but can be modified or omitted to the extent that it does not depart from the spirit of the present disclosure. In addition, elements common to each figure are marked with the same signs, and duplicate description is omitted.

Embodiment 1

Refrigeration Cycle Device and Compressor

Figure 1:
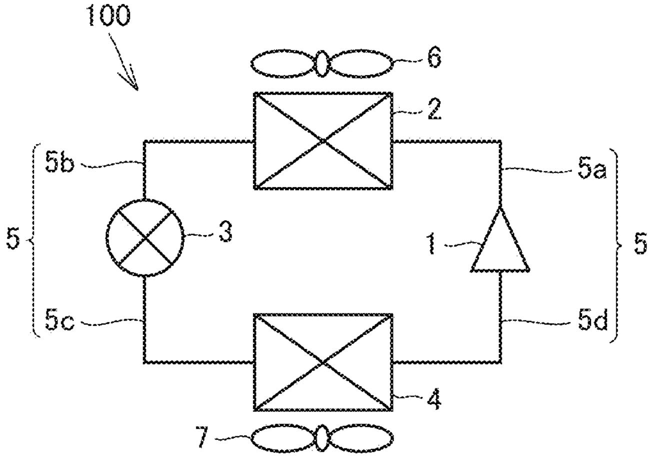
FIG. 1 is a constitutional view of a refrigeration cycle device according to an embodiment.

FIG. 1 is a constitutional view of a refrigeration cycle device according to Embodiment 1.

As illustrated in FIG. 1, the refrigeration cycle device of the present embodiment comprises a compressor 1, a condenser 2, an expansion valve 3, and an evaporator 4. These are connected by refrigerant pipings 5*a* to 5*d* to form a refrigerant circuit 5.

In refrigerant circuit 5, a gaseous refrigerant flows, and the refrigerant is compressed in compressor 1. In condenser 2, the gaseous refrigerant that has been compressed in compressor 1 is cooled to become a high-pressure liquid refrigerant or a gas-liquid two-phase refrigerant. In expansion valve 3, the high-pressure liquid refrigerant or gas-liquid two-phase refrigerant is depressurized. In evaporator 4, the refrigerant that has been depressurized is heated to become a low-pressure gaseous refrigerant. Compressor 1 sucks the refrigerant that has become a low-pressure gaseous form by evaporator 4 and compresses it again. In this way, the refrigerant circulates in refrigerant circuit 5 of a refrigeration cycle device 100.

Note that a condenser blower 6 is a component that sends air to condenser 2 and is provided in order to accelerate the absorption or release of heat through heat exchange with the air by the refrigerant flowing in condenser 2. In addition, an evaporator blower 7 is a component that sends air to evaporator 4 and is provided in order to accelerate the absorption or release of heat through heat exchange with the air by the refrigerant flowing in evaporator 4.

Note that the refrigeration cycle device may be any of the following: a device that can perform both cooling and heating, a device that can perform only cooling, and a device that can perform only heating, and can be applied to various refrigeration and air-conditioning devices.

Figure 2:
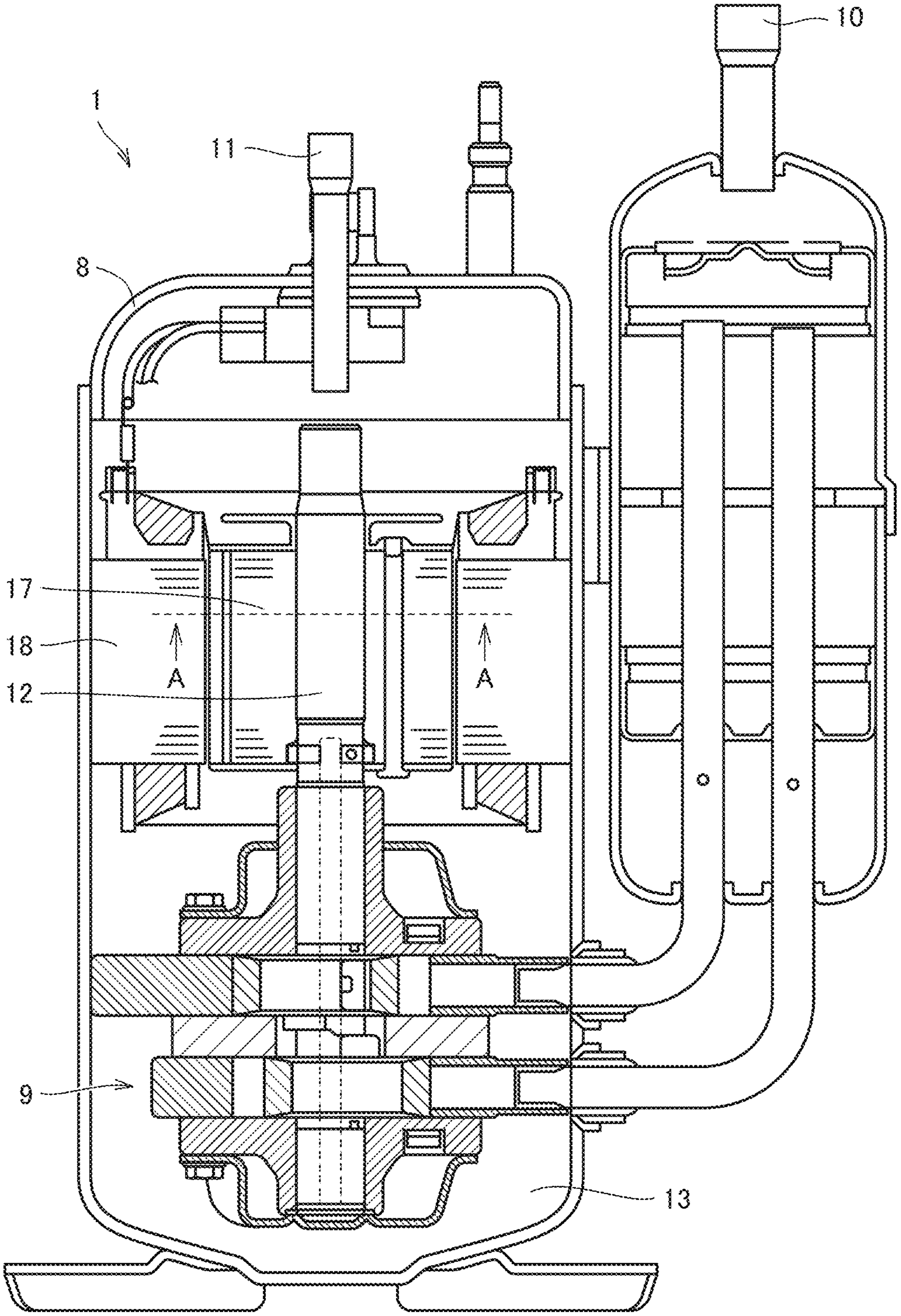
FIG. 2 is a cross-sectional view illustrating a cross-section parallel to the axial direction of the main axis of a motor of a compressor according to an embodiment.

FIG. 2 is a cross-sectional view illustrating one example of a compressor of a refrigeration cycle device according to the present embodiment.

As illustrated in FIG. 2, a compressor (electric refrigerant compressor) 200 comprises a shell 8. The shell comprises a compression mechanism 9 inside, and a suction pipe 10 for allowing a refrigerant to flow inside and a discharge pipe 11 for allowing the refrigerant to flow out are connected thereto. Compression mechanism 9 is configured to compress the refrigerant that has entered shell 8 from suction pipe 10 and discharge it from discharge pipe 11.

Note that compressor 1 comprises a motor part having a shaft 12, a rotor 17, and a stator 18. Compression mechanism 9 is driven by this motor part.

Then, a refrigerating machine oil (lubricating oil) is stored in an oil reservoir 13 for lubricating compression mechanism 9 and a sliding part in the motor part.

Figure 3:
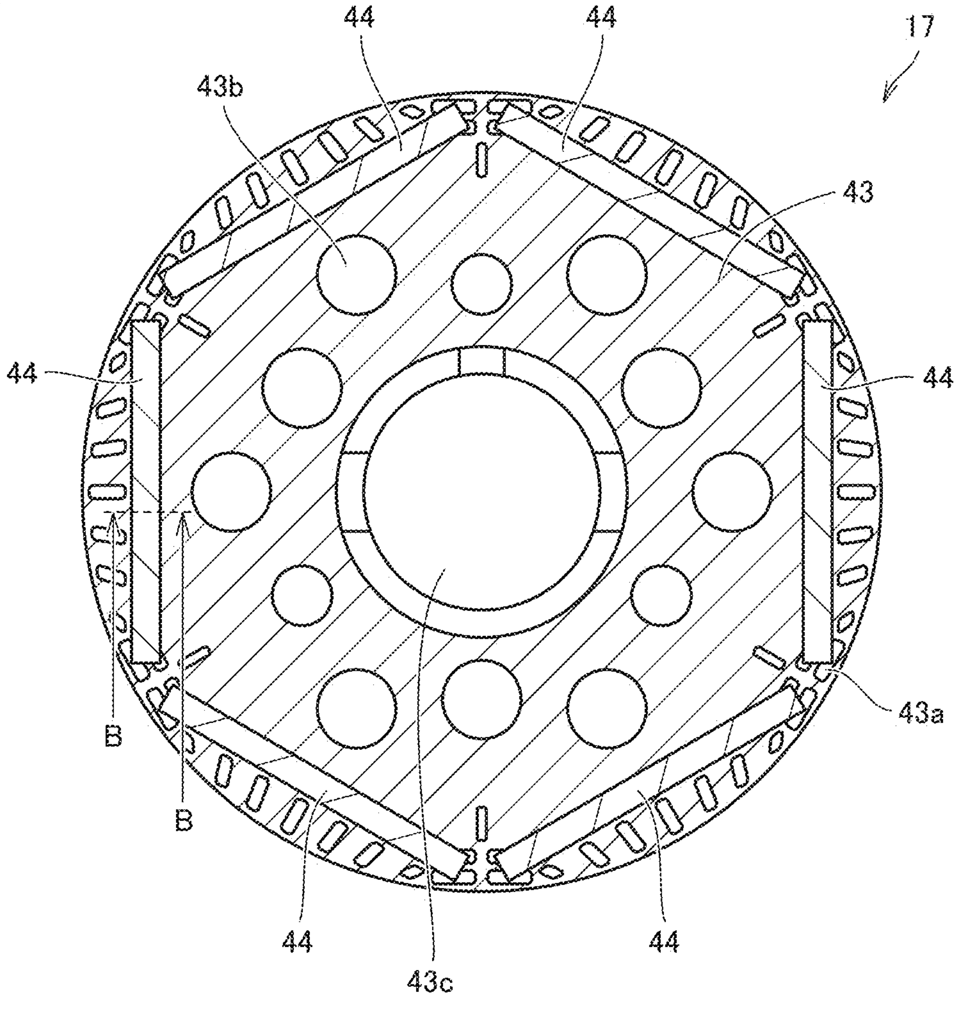
FIG. 3 is a cross-sectional view illustrating the A-A cross-section in FIG. 2 of a rotor that the compressor according to an embodiment has.

FIG. 3 is a cross-sectional view illustrating the A-A cross-section in FIG. 2 of the rotor that the compressor according to the embodiment has.

As illustrated in FIG. 3, rotor 17 has a rotor core 43 and a plurality of magnets 44.

Rotor core 43 is formed by stacking a plurality of disc-shaped steel plates. Rotor core 43 is also formed so that a plurality of magnet insertion holes 43*a*, a plurality of refrigerant passage holes 43*b*, and a shaft hole 43*c* penetrate in the direction where the steel plates are stacked. Magnets 44 are inserted in magnet insertion holes 43*a*.

Refrigerant passage holes 43*b* are holes for allowing the refrigerant that has been compressed in compression mechanism 9 to pass through, and after passing through them, the refrigerant is discharged to refrigerant piping 5*a* via discharge pipe 11.

Shaft 12 is inserted in shaft hole 43*c*.

Figure 4:
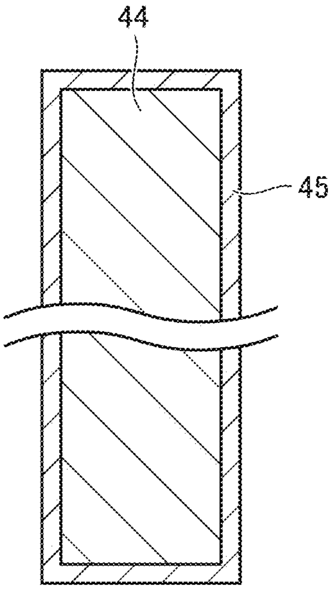
FIG. 4 is a cross-sectional view illustrating the B-B cross-section in FIG. 3 of a magnet that the compressor according to an embodiment has.

FIG. 4 is a cross-sectional view illustrating the B-B cross-section in FIG. 3 of magnet 44 according to the embodiment.

As illustrated in FIG. 4, it is preferable that the surface of magnet 44 be provided with a film 45. Film 45 is formed so as to cover the entire surface of magnet 44. Note that, in FIG. 4, the surface of magnet 44 on the front side of the paper and the surface of magnet 44 on the back side of the paper are also covered with film 45. The film thickness of film 45 is not particularly limited, and for example, film 45 with a film thickness of 100 μm or less is formed.

It is more preferable that film 45 be an inorganic film with excellent heat resistance and oil resistance. It is preferable that film 45 include at least aluminum (Al) and silicon (Si), and it is more preferable that it include aluminum (Al), silicon (Si), and magnesium (Mg). Note that it is still more preferable that film 45 not include phosphorus (P).

In addition, the method for forming film 45 on magnets 44 is not particularly limited, and existing film forming methods can be used. For example, sputtering, chemical vapor deposition (CVD), deposition, ion plating, ion beam deposition, dip coating, spin coating, spray coating, plating, and other methods can be selected as appropriate.

Stator 18 (FIG. 2) has an insulating film made of polyester, for example. Here, examples of the polyester include polyethylene terephthalate (PET), polybutylene terephthalate (PBT), polyethylene naphthalate (PEN), polybutylene naphthalate (PBN), polytrimethylene terephthalate (PTT), poly-1,4-cyclohexanedimethylene terephthalate (PCT), or their copolymers or composite materials.

As described above, in the present embodiment, refrigeration cycle device 100 comprises a refrigerant and a compressor that compresses the refrigerant. The compressor comprises a refrigerating machine oil that lubricates a sliding part of the compressor, Hereinafter, the refrigerant and the refrigerating machine oil will be described.

[Refrigerant]

The refrigerant used in the present embodiment includes at least trifluoroiodomethane ($CF_3I$: R-13I1). The refrigerant may be, for example, a single refrigerant of R-13I1 or it may be a mixed refrigerant including other refrigerants and R-13I1.

R-13I1 has an extremely low GWP of 0.4, and is classified as non-flammable (Class 1) according to the ANSI/ASHRAE Standard 34-2019. Accordingly, refrigerants including R-13I1 can obtain characteristics of a low GWP and low flammability.

It is preferable that the GWP of the refrigerant (including R-13I1) be 750 or less. Refrigerants with a GWP of 750 or less are refrigerants with excellent environmental performance and are highly compliant with legal regulations. In addition, refrigerants with a GWP of 750 or less can be used not only for refrigerating machines but also for air-conditioning machines, as will be described later, as refrigeration cycle devices. Note that the GWP used is the value from the Fifth Assessment Report (AR5) of the Intergovernmental Panel on Climate Change (IPCC) (100-year value). In addition, for the GWP of refrigerants not listed in AR5, a value listed in other publicly known literature may be used, or a value calculated or measured using known methods may be used.

It is also preferable that the refrigerant be a refrigerant whose flammability category is classified as non-flammable according to the ANSI/ASHRAE Standard 34-2019. For refrigerants classified as non-flammable, there is no need to provide a means, facility, or structure that diffuses refrigerants that have leaked into the refrigeration cycle device, a sensor to detect refrigerant leakage, and an alarm device that gives an alarm when the sensor detects refrigerant leakage. In addition, refrigerants classified as non-flammable can be used even in areas where the use of flammable refrigerants is not permitted by legal regulations.

It is also preferable that the refrigerant include R-32 ($CH_2F_2$). The inclusion of R-32 can ensure high refrigeration capacity and high energy efficiency.

Moreover, it is more preferable that the refrigerant include R-125 ($C_2HF_5$) in addition to R-32. The inclusion of R-125 can reduce the temperature gradient, which is the temperature difference between the start temperature and the end temperature of the phase change of the refrigerant.

Accordingly, a mixed refrigerant including R-32, R-125, and R-13I1 has a low GWP and low flammability, and the use of such a mixed refrigerant can provide a refrigeration cycle device with excellent refrigeration capacity and energy efficiency.

One suitable example of the refrigerant is a refrigerant that includes 39% by mass or more and 40% by mass or less of R-13I1, 47% by mass or more and 49.5% by mass or less of R-32, and 11% by mass or more and 13.5% by mass or less of R-125, wherein the sum of the R-13I1, R-32, and R-125 contents is 100% by mass. Among the above, one particularly suitable example of the refrigerant is a refrigerant that includes 39.5% by mass of R-13I1, 49% by mass of R-32, and 11.5% by mass of R-125. The refrigerant having such a composition has a GWP of 733, and is classified as non-flammable (Class 1).

Alternatively, the refrigerant may be a mixed refrigerant of a halogenated hydrocarbon having an unsaturated bond and R-13I1, or a refrigerant formed by mixing them with a hydrofluorocarbon such as R-32, R-125, R-134a, R-152a, or R-41. Halogenated hydrocarbons having an unsaturated bond are hydrocarbons having at least one carbon-carbon double bond or carbon-carbon triple bond and further having at least one halogen element (such as F, Cl, Br, or I). Halogenated hydrocarbons having an unsaturated bond have a lower GWP compared to hydrofluorocarbons such as R-32 and R-125, and by mixing them, the GWP of the refrigerant can be lowered.

Specific examples of the halogenated hydrocarbon having an unsaturated bond include:

- a hydrofluoroethylene such as HFO-1141, R-1132a, HFO-1132(E), HFO-1132(Z), and HFO-1123;
- a hydrofluoropropylene such as HFO-1225ye(Z), HFO-1225ye(E), HFO-1225zc, R-1234yf, R-1234ze(E), HFO-1234ze(Z), HFO-1234ye(Z), HFO-1234ye(E), HFO-1243zf, HFO-1252zf, and HFO-1261yf;
- a hydrofluorobutene such as R-1336mzz(E), R-1336mzz(Z), HFO-1336ze(Z), HFO-1336ze(E), HFO-1336yf, HFO-1336pyy, HFO-1327cze, HFO-1327et, HFO-1327, HFO-1345czf, HFO-1345fyc, HFO-1345cye, HFO-1345cyf, HFO-1345eye, HFO-1345pyz, HFO-1345pyy(E), HFO-1345pyy(Z), HFO-1345zy(E), and HFO-1345zy(Z);
- a hydrochlorofluoropropylene such as R-1224yd(Z) and R-1233zd(E); and
- a perfluoroolefin such as PFO-1216.

In particular, it is preferable that the halogenated hydrocarbon having an unsaturated bond be a hydrofluoroethylene or a hydrofluoropropylene from the viewpoint of making the refrigerant a mixed refrigerant having an operating pressure close to that of R-410A. Among the above, more preferred are R-1132a, HFO-1132(E), HFO-1132(Z), HFO-1123, HFO-1225ye(Z), HFO-1225ye(E), HFO-1225zc, R-1234yf, R-1234ze(E), HFO-1234ze(Z), HFO-1234ye(Z), HFO-1234ye(E), and HFO-1243zf.

[Refrigerating Machine Oil]

The refrigerating machine oil used in the present embodiment includes a base oil and a quinone additive.

[Base Oil]

The base oil is not particularly limited, and examples thereof include a polyol ester oil, a polyvinyl ether oil, a polyalkylene glycol oil, an alkylbenzene oil, an alkylnaphthalene oil, a mineral oil, a poly-α-olefin oil, and a mixture thereof. Note that the base oil may include a compound having a linear or branched hydrocarbon chain.

(Quinone Additive)

The quinone additive is at least one selected from the group consisting of 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, 2-hydroxy-1,4-naphthoquinone, and 1,4-anthraquinone.

These quinone additives can capture the radicals produced by decomposition of R-13I1. Accordingly, the reliability of the refrigeration cycle device and compressor can be improved by compounding these quinone additives in the refrigerating machine oil. Hereinafter, the quinone additive will be described in detail.

R-13I1 included in the refrigerant used in the present embodiment is decomposed (C—I bond is cleaved) at a high temperature to produce a trifluoromethyl radical ($CF_3\cdot$) and an iodine radical ($I\cdot$). In particular, there are concerns about the decomposition of the refrigerant since the temperature of the refrigerant becomes high at the sliding part such as the motor part of the compressor and the refrigerant discharge part of the compressor.

These produced radicals abstract a hydrogen atom (H) from organic compounds and other substances in the refrigerant circuit to produce methane trifluoride ($CHF_3$: R-23) and hydrogen iodide (HI). Here, as an example, the abstraction reaction of a hydrogen atom from an organic compound by a trifluoromethyl radical is shown in the following formula (1). Here, R1 and R2 each have an arbitrary structure.

[Formula 1]

(1)

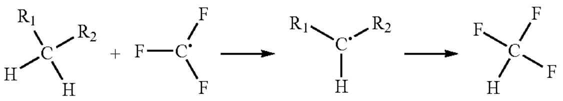

R-23 is a refrigerant with a lower boiling point compared to that of R-13I1, and an increase in the amount of R-23 may affect the physical properties of the refrigerant. In addition, HI is an acidic substance that may cause corrosion of metal members. Furthermore, there is a risk that the organic compound that has been radicalized by the hydrogen atom abstraction reaction will react with a surrounding organic compound in a chain reaction and turn into a high molecular weight contaminant.

Accordingly, it is desirable to include in the refrigerant circuit a substance that captures the radicals produced by decomposition of R-13I1, thereby capturing and inactivating the radicals.

In the present embodiment, an additive that captures the radicals produced by decomposition of R-13I1 is included in the refrigerating machine oil. Then, the present inventors have found that some quinone compounds are particularly effective as the additive that captures the radicals.

According to the Encyclopedic Dictionary of Chemistry (authored by Oki, M. et al., 1st edition, Tokyo Kagaku Doujin, 1989), the term "quinone" is the generic name for compounds formed by changing two CH atomic groups in an aromatic compound to CO atomic groups and further moving double bonds as necessary to form a quinoid structure (the structure on the left side or the structure on the right side as shown in formula (2)).

[Formula 2]

(2)

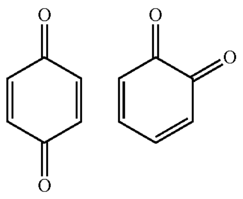

Among quinones, 1,4-benzoquinone and 1,4-naphthoquinone are used as polymerization inhibitors in the synthesis of polymers by radical polymerization. According to a report by Bickel et al. (J. Chem. Soc., P. 1764, 1950), when a quinone reacts as a polymerization inhibitor with a propagating radical, an oxygen atom (C═O bond) of the quinone reacts with the propagating radical and the quinone is converted into an ether compound.

The present inventors calculated the heat of reaction for the capture reaction of a trifluoromethyl radical and an iodine radical by each of the unsaturated C═C bond and C═O bond that quinones have according to the density functional theory, and determined the reaction that is most likely to proceed spontaneously. Then, they revealed that the capture reaction of a trifluoromethyl radical and an iodine radical by quinones occurs not at the C═O bond, but at the C═C bond.

This means that, in the present disclosure, quinones are used in a new application not as polymerization inhibitors.

The capture reaction of a trifluoromethyl radical and an iodine radical by quinones occurs competitively with the hydrogen atom abstraction reaction by these radicals (such as the reaction of formula (1)). Therefore, the present inventors considered it necessary to use compounds with high reactivity to a trifluoromethyl radical and an iodine radical among quinones in order to inhibit the progress of the hydrogen atom abstraction reaction by the radicals and to allow the capture reaction of a trifluoromethyl radical and an iodine radical by quinones to proceed.

Then, in a system where two reactions occur competitively, if the reactants are exposed to a high temperature, such as the refrigerant and the refrigerating machine oil in the compressor, a reaction with a lower heat of reaction (a reaction that changes to a more stable state) will occur predominantly.

Therefore, the present inventors calculated, for 12 quinones, the heat of reaction (enthalpy change before and after the reaction: ΔH) of the trifluoromethyl radical capture reaction by the quinones using the density functional theory and compared it with the heat of reaction of formula (1).

By doing so, the present inventors identified types of quinones that have a lower heat of reaction of the trifluoromethyl radical capture reaction than that of formula (1) and are capable of inhibiting the reaction of formula (1).

The conditions for calculation by the density functional theory are as follows.

Calculation software: GAMESS Version June 30
Functional: B3LYP
Basis function: 6-311++G(d,p)
RUNTYP: OPTIMIZE
TIMLIM: 600000
MEMORY: 10000000
NSTEP: 200
OPTTOL: 0.0001

Note that, in the calculation of the heat of reaction of formula (1), pentane was used as a simple structure of the hydrocarbon chain of an organic compound included in the refrigerating machine oil or the like, and the heat of reaction of the hydrogen abstraction reaction from the third carbon of pentane by a trifluoromethyl radical (formula (3)) (that is, the capture reaction of a trifluoromethyl radical by quinones) was calculated. As a result, the heat of reaction of formula (3) was found to be −31.4 kJ/mol.

[Formula 3]

(3)

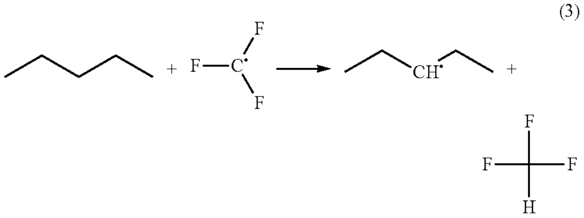

As the 12 quinones, the following quinones, which are available as reagents among quinones, were selected: 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, 2-hydroxy-1,4-naphthoquinone, 9,10-anthraquinone, 1,4-anthraquinone, and phenanthrenequinone.

For these 12 quinones, Table 1 shows the results of calculated heat of reaction of the capture reaction of a trifluoromethyl radical by the quinones.

Note that the position at which the trifluoromethyl radical is added to the quinones was selected as the most energetically stable position by determining the energy of the structures after addition of the trifluoromethyl radical for all C═C bonds and C═O bonds.

TABLE 1

(Heat of reaction of capture reaction of trifluoromethyl radical ($CF_3$•) by quinones)

| Compound name | Structure after capturing $CF_3$• | Heat of reaction $\Delta H$ [kJ/mol] | $\Delta H$ < −31.4KJ/mol |
|---|---|---|---|
| 1,4-Benzoquinone | 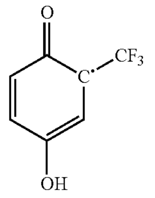 | −197.3 | Yes |
| 1,2-Benzoquinone | 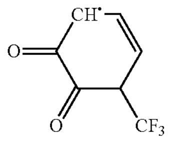 | −152.0 | Yes |
| 2-Methyl-1,4-benzoquinone | 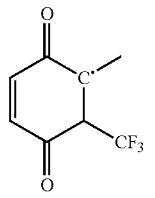 | −119.8 | Yes |
| 2-Phenyl-1,4-benzoquinone | 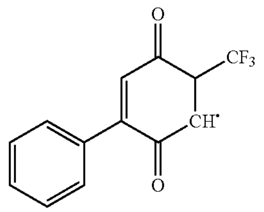 | −136.1 | Yes |
| 2-tert-Butyl-1,4-benzoquinone | 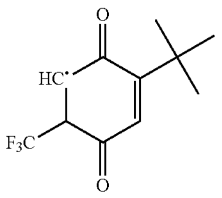 | −40.3 | Yes |
| 1,4-Naphthoquinone | 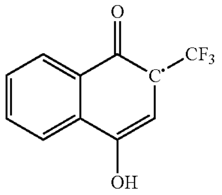 | −168.5 | Yes |

TABLE 1-continued (Heat of reaction of capture reaction of trifluoromethyl radical ($CF_3$•) by quinones)

| Compound name | Structure after capturing $CF_3$• | Heat of reaction ΔH [kJ/mol] | ΔH < −31.4KJ/mol |
|---|---|---|---|
| 1,2-Naphthoquinone | 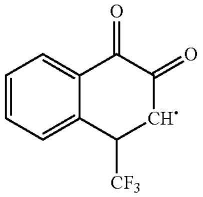 | −111.8 | Yes |
| 2,6-Naphthoquinone | 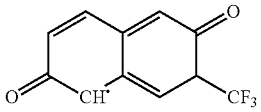 | −124.7 | Yes |
| 2-Hydroxy-1,4-naphthoquinone | 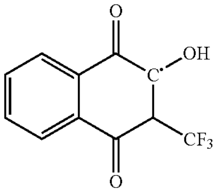 | −90.7 | Yes |
| 9,10-Anthraquinone | 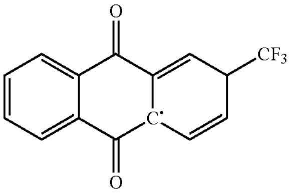 | 7.0 | No |
| 1,4-Anthraquinone | 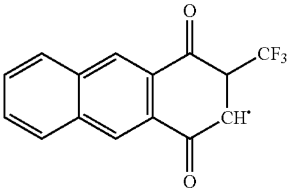 | −109.5 | Yes |
| Phenanthrenequinone | 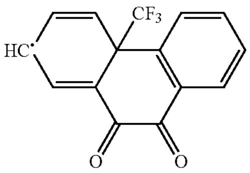 | −26.0 | No |

As shown in Table 1, among the 12 quinones, it was determined that the quinones with a lower heat of reaction (ΔH) than the heat of reaction of formula (3) (−31.4 KJ/mol) were 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, 2-hydroxy-1,4-naphthoquinone, and 1,4-anthraquinone.

These quinones can capture the trifluoromethyl radical generated by decomposition of R-13I1. As a result of this, the production of methane trifluoride ($CHF_3$) is suppressed, thus preventing degradation of the cooling performance of the refrigerant.

In addition, the radical generated by a quinone capturing the trifluoromethyl radical ($CF_3$·) can also capture the iodine radical (I·), as shown in formula (4). As a result of this, the production of hydrogen iodide (HI) is suppressed, which in turn suppresses corrosion of metal members due to hydrogen iodide and can improve the reliability of the refrigeration cycle device and compressor.

[Formula 4]

(4)

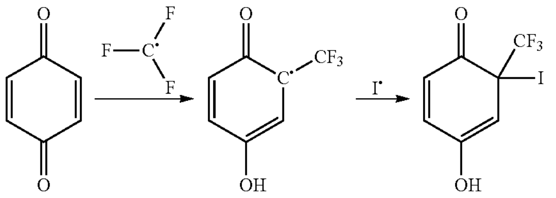

Note that Patent Literature 1 describes that the addition of additives such as a stabilizer and a polymerization inhibitor to a mixed refrigerant including R13I1 inhibits the decomposition of R-13I1, which has low thermochemical stability, and thus can prevent the deterioration of the mixed refrigerant itself and the production of deteriorated substances associated with the decomposition of R-13I1, and lists quinone compounds as examples of the polymerization inhibitor. However, Patent Literature 1 does not describe that the reaction in which quinones capture the decomposition products of R-13I1 is different from the polymerization inhibitory reaction, nor does it describe that the compounds having the effect of being able to capture the decomposition products of R-13I1 are limited among compounds classified as quinones.

The proportion of the amount of the quinone additive included in the refrigerating machine oil to the amount of the refrigerating machine oil is preferably 0.1% by mass or more and 10% by mass or less, and more preferably 0.5% by mass or more and 4% by mass or less. In this case, the effect of capturing the decomposition products of R-13I1 is achieved more reliably. Note that the content (concentration) of the quinone additive in the refrigerating machine oil can be measured by gas chromatography-mass spectrometry.

(Other Additives)

Note that, in addition to the above quinone additive, the refrigerating machine oil may also include an antioxidant, an acid scavenger, an extreme pressure agent (anti-wear agent), an oxygen scavenger, and the like.

Examples of the antioxidant include a phenolic antioxidant such as 2,6-di-tert-butyl-4-methylphenol, 2,6-di-tert-butyl-4-ethylphenol, and 2,2'-methylenebis(4-methyl-6-tert-butylphenol), and an amine antioxidant such as phenyl-α-naphthylamine and N,N'-di-phenyl-p-phenylenediamine.

Examples of the acid scavenger may include phenyl glycidyl ether, alkyl glycidyl ether, alkylene glycol glycidyl ether, cyclohexene oxide, α-olefin oxide, and an epoxy compound such as epoxidized soybean oil. In particular, at least one selected from glycidyl ester, glycidyl ether, and α-olefin oxide is preferred.

Examples of the extreme pressure agent (anti-wear agent) include a phosphorus-based extreme pressure agent. Examples of the phosphorus-based extreme pressure agent include a phosphate ester, an acidic phosphate ester, a phosphite ester, an acidic phosphite ester, and amine salts thereof. In particular, tricresyl phosphate, trithiophenyl phosphate, tri(nonylphenyl) phosphite, dioleyl hydrogen phosphite, and 2-ethylhexyl diphenyl phosphite are preferred.

Examples of the oxygen scavenger include a sulfur-containing aromatic compound, a variety of olefins, an aliphatic unsaturated compound (such as diene and triene), and a cyclic terpene having an unsaturated bond.

Examples of the sulfur-containing aromatic compound include 4,4'-thiobis(3-methyl-6-tert-butylphenol), diphenyl sulfide, dioctyl diphenyl sulfide, dialkyl diphenylene sulfide, benzothiophene, dibenzothiophene, phenothiazine, benzothiapyran, thiapyran, thianthrene, dibenzothiapyran, and diphenylene disulfide.

Examples of the cyclic terpene having an unsaturated bond include α-pinene, β-pinene, limonene, and phellandrene.

In particular, an aliphatic unsaturated compound, a cyclic terpene having an unsaturated bond, and the like are preferred.

Note that the moisture included in the refrigerating machine oil is preferably 100 ppm by mass or less. When the moisture included in the refrigerating machine oil is set to 100 ppm by mass or less, the deterioration of the refrigerant, refrigerating machine oil, or metal members due to moisture can be suppressed.

Embodiment 2

In the present embodiment, the compressor comprises a rotor having a neodymium magnet.

That is, magnets 44 illustrated in FIG. 3 are neodymium magnets. Note that a neodymium magnet is a magnet that includes neodymium (Nd). Examples of the neodymium magnet include a Nd—Fe—B sintered body. The composition ratio in a representative example of the neodymium magnet is 66% by mass of iron (Fe), 28% by mass of neodymium (Nd), 5% by mass of dysprosium (Dy), and 1% by mass of boron (B). However, magnets 44 may be neodymium magnets whose composition ratio differs from that described above for a reason such as improving magnetic characteristics or mechanical characteristics, or they may be neodymium magnets including elements other than those included in the composition ratio described above. Note that magnets 44 correspond to metal members of compressor 1.

Also, the present embodiment is different from Embodiment 1 in that the quinone additive compounded in the refrigerating machine oil is at least one selected from the group consisting of 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, and 1,4-anthraquinone.

The present embodiment is the same as Embodiment 1 in all other respects. In the present embodiment, in addition to the same effects as in Embodiment 1, the effect of suppressing hydrogen embrittlement of neodymium magnets is achieved. Hereinafter, the details of the present embodiment will be described.

When quinones react with a hydrogen molecule, they are reduced and converted into hydroquinone, and thus have the effect of capturing the hydrogen molecule in the refrigerant circuit. As an example, the capture reaction of a hydrogen molecule by 1,4-benzoquinone is shown in formula (5).

[Formula 5]

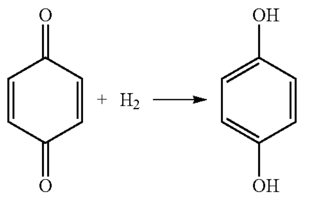

(5)

When hydrogen iodide is generated in the refrigerant circuit due to the decomposition of R-13I1, hydrogen iodide may react with the metal members in the refrigerant circuit and the hydrogen molecule may be generated (formula (6)). In formula (6), M is a metallic element, and in particular, Mg, Al, zinc (Zn), iron (Fe), and other elements whose ionization tendency is smaller than that of hydrogen may react with hydrogen iodide.

[Formula 6]

$$M+nH^+ \rightarrow M^{n+}+n/2H_2 \quad (6)$$

When the hydrogen molecule is generated in the refrigerant circuit, the neodymium magnets may absorb the hydrogen molecule and become embrittled. When the neodymium magnets absorb hydrogen, they form a hydride, which causes disintegration and pulverization (formula (7)). Note that, in formula (7), $Nd_2Fe_{14}B$ is the main phase of the neodymium magnets.

[Formula 7]

$$Nd_2Fe_{14}B+n/2H_2 \rightarrow Nd_2Fe_{14}BH_n \quad (7)$$

In a report by Anikina et al. (Inorg. Mater.: Appl. Res., Vol. 7, No. 4, P. 497, 2016), it is shown that the heat of reaction (enthalpy change: ΔH) when $Nd_2Fe_{14}B$ absorbs a hydrogen molecule becomes a lower value when the composition ratio of a hydrogen atom ($H/Nd_2Fe_{14}B$) is lower (that is, hydrogenation is less advanced). In this report, −82.8 KJ/mol in the range of $0.3<H/Nd_2Fe_{14}B<0.6$ is the lowest value of ΔH.

The present inventors thought that, in order to suppress the reaction of formula (7), it was necessary for the refrigerating machine oil to include a quinone that causes a thermodynamically superior capture reaction of a hydrogen molecule ("ΔH<−82.8 kJ/mol") to the reaction of formula (7).

Therefore, the present inventors calculated the heat of reaction of the hydrogen molecule capture reaction for the above 11 quinones. The calculation results are shown in Table 2. Note that the calculation conditions are the same as those described above as "conditions for calculation by the density functional theory".

TABLE 2

(Heat of reaction of capture reaction of hydrogen molecule by quinones)

| Compound name | Heat of reaction [kJ/mol] | ΔH < −2.8 kJ/mol |
|---|---|---|
| 1,4-Benzoquinone | −160.2 | Yes |
| 1,2-Benzoquinone | −184.0 | Yes |
| 2-Methyl-1,4-benzoquinone | −146.5 | Yes |
| 2-Phenyl-1,4-benzoquinone | −160.5 | Yes |

TABLE 2-continued (Heat of reaction of capture reaction of hydrogen molecule by quinones)

| Compound name | Heat of reaction [kJ/mol] | ΔH < −2.8 kJ/mol |
|---|---|---|
| 2-tert-Butyl-1,4-benzoquinone | −146.3 | Yes |
| 1,4-Naphthoquinone | −105.0 | Yes |
| 1,2-Naphthoquinone | −121.0 | Yes |
| 2,6-Naphthoquinone | −193.1 | Yes |
| 2-Hydroxy-1,4-naphthoquinone | −52.2 | No |
| 9,10-Anthraquinone | −36.2 | No |
| 1,4-Anthraquinone | −86.7 | Yes |
| Phenanthrenequinone | −95.9 | Yes |

As shown in Table 2, it was found that the quinones whose heat of reaction of the hydrogen molecule capture reaction was a value lower than the heat of reaction of formula (7) (−82.8 kJ/mol) were 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, 1,4-anthraquinone, and phenanthrenequinone.

These quinones can capture the hydrogen molecule generated in the refrigerant circuit and suppress the embrittlement of neodymium magnets, which thus can contribute to improvement in the reliability of the refrigeration cycle device or compressor.

As described above, among quinones, the above compounds used in the present embodiment have both the effect of capturing the decomposition products of R-13I1 and the effect of capturing the hydrogen molecule in the refrigerant circuit, and thus can contribute to the increased reliability of the refrigeration cycle device and compressor.

Embodiment 3

In the present embodiment, the quinone additive compounded in the refrigerating machine oil is at least one selected from the group consisting of 1,4-naphthoquinone, 1,2-naphthoquinone, 2-hydroxy-1,4-naphthoquinone, and 1,4-anthraquinone.

The present embodiment is the same as Embodiment 1 in all other respects.

Even when the base oil includes a compound having a linear hydrocarbon chain, these quinones do not accelerate deterioration of the refrigerating machine oil. As a result of this, the reliability of the refrigeration cycle device and compressor can be further improved. Hereinafter, the details of the present embodiment will be described.

Since quinones have high oxidation reactivity, when quinone additives are compounded in the refrigerating machine oil, they may, as a side effect, oxidize (dehydrogenate) surrounding organic compounds (organic compounds included in the refrigerating machine oil, polyester insulating film, and other materials).

From the viewpoint of suppressing the deterioration of organic compounds in the materials used for the refrigeration cycle device or compressor, it is preferable that the quinone additive compounded in the refrigerating machine be a quinone with low oxidation reactivity to the organic compounds.

As an example, the oxidation reaction of n-pentane by 1,4-benzoquinone is shown in formula (8). Here, n-pentane is a simple example of the compound having a linear hydrocarbon chain structure. Note that n-pentane is an example, and the linear hydrocarbon chain is not limited to five carbon atoms.

[Formula 8]

(8)

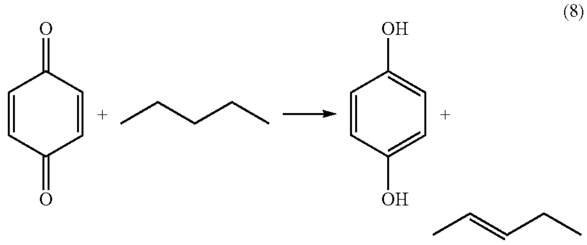

Specific examples of the linear hydrocarbon chain structure include a structure derived from a fatty acid constituting a polyol ester oil (such as n-pentanoic acid and n-heptanoic acid), an alkyl chain constituting an alkylbenzene oil and an alkylnaphthalene oil, a side chain of a polyvinyl ether oil (such as —O—$CH_2CH_3$), and a diol constituting a mineral oil, a polyalkylene glycol oil, and a polyester (such as ethylene glycol).

When the reaction of formula (8) forms a C═C bond in the hydrocarbon chain of organic compounds such as refrigerating machine oil and polyester, there is a risk that high reactivity of the C═C bond will cause the organic compounds to react with oxygen and other substances mixed in the refrigerant circuit in a chain reaction, resulting in deterioration.

In addition, there is a risk that the radicals produced by the decomposition of R-13I1 in the refrigerant will be added to the C═C bond of the organic compounds, radicalizing the organic compounds, and causing them to be polymerized and turned into sludge through a chain reaction.

The heat of reaction of the reaction of formula (8) for 1,4-benzoquinone is a negative value (−25.9 kJ/mol), which means that the reaction of formula (8) is an exothermic reaction. Since the refrigerating machine oil and insulating film in the compressor are exposed to a high temperature, when the reaction of formula (8) is an exothermic reaction, the reaction may proceed spontaneously as the reaction system exceeds its activation energy due to the high temperature.

Here, for the above 11 quinones, the heat of reaction of the oxidation reaction of n-pentane by the quinones was calculated. The calculation results are shown in Table 3. Note that the calculation conditions are the same as those described above as "conditions for calculation by the density functional theory".

TABLE 3

(Heat of reaction of oxidation reaction of n-pentane by quinones)

| Compound name | Heat of reaction [kJ/mol] |
|---|---|
| 1,4-Benzoquinone | −25.9 |
| 1,2-Benzoquinone | −49.7 |
| 2-Methyl-1,4-benzoquinone | −12.2 |
| 2-Phenyl-1,4-benzoquinone | −26.2 |
| 2-tert-Butyl-1,4-benzoquinone | −12.0 |
| 1,4-Naphthoquinone | 29.3 |
| 1,2-Naphthoquinone | 13.4 |
| 2,6-Naphthoquinone | −58.7 |
| 2-Hydroxy-1,4-naphthoquinone | 82.1 |
| 9,10-Anthraquinone | 98.1 |
| 1,4-Anthraquinone | 47.6 |
| Phenanthrenequinone | 38.4 |

From Table 3, it can be seen that, among the 11 quinones, the quinones for which the oxidation reaction of n-pentane (formula (8)) is not an exothermic reaction (the heat of reaction is a positive value) are 1,4-naphthoquinone, 1,2-naphthoquinone, 2-hydroxy-1,4-naphthoquinone, 9,10-anthraquinone, 1,4-anthraquinone, and phenanthrenequinone.

These quinones are not likely to oxidize linear hydrocarbon chains and thus do not accelerate the deterioration of compounds having linear hydrocarbon chains present in the refrigerant circuit. This means that, for example, even when these quinones are added to a refrigerating machine oil including compounds having linear hydrocarbon chains, they do not accelerate deterioration of the refrigerating machine oil.

Here, the results of the above three tables, Table 1 to Table 3, are summarized in Table 4.

TABLE 4

| Compound name | Effect of capturing decomposition product ($CF_3$•) of R-13I1 | Effect of suppressing hydrogen embrittlement of neodymium magnet | Linear hydrocarbon oxidation reactivity |
|---|---|---|---|
| 1,4-Benzoquinone | High (good) | High (good) | High |
| 1,2-Benzoquinone | High (good) | High (good) | High |
| 2-Methyl-1,4-benzoquinone | High (good) | High (good) | High |
| 2-Phenyl-1,4-benzoquinone | High (good) | High (good) | High |
| 2-tert-Butyl-1,4-Benzoquinone | High (good) | High (good) | High |
| 1,4-Naphthoquinone | High (good) | High (good) | Low (good) |
| 1,2-Naphthoquinone | High (good) | High (good) | Low (good) |
| 2,6-Naphthoquinone | High (good) | High (good) | High |
| 2-Hydroxy-1,4-naphthoquinone | High (good) | Low | Low (good) |
| 9,10-Anthraquinone | Low | Low | Low (good) |
| 1,4-Anthraquinone | High (good) | High (good) | Low (good) |
| Phenanthrenequinone | Low | High (good) | Low (good) |

From Table 4, it can be seen that, among the quinone additives used in Embodiment 1 that are highly effective in capturing the decomposition products of R-13I1, the quinones that do not accelerate the deterioration of linear hydrocarbon chains of organic compounds, which is a side effect, are 1,4-naphthoquinone, 1,2-naphthoquinone, 2-hydroxy-1,4-naphthoquinone, and 1,4-anthraquinone.

Accordingly, when at least any of 1,4-naphthoquinone, 1,2-naphthoquinone, 2-hydroxy-1,4-naphthoquinone, and 1,4-anthraquinone is added to the refrigerating machine oil, in addition to the effect of Embodiment 1, it is possible to suppress the acceleration of deterioration of linear hydrocarbon chains of organic compounds and to provide a refrigeration cycle device with high reliability.

Note that, from Table 4, it is preferable that the quinone additive compounded in the refrigerating machine oil be at least one selected from the group consisting of 1,4-naphthoquinone, 1,2-naphthoquinone, and 1,4-anthraquinone when the compressor comprises a rotor having a neodymium magnet. In this case, in addition to the effect of the present embodiment, the effect of suppressing embrittlement of the neodymium magnet can also be obtained, as in Embodiment 2.

Embodiment 4

In the present embodiment, the quinone additive compounded in the refrigerating machine oil is at least one selected from the group consisting of 1,4-naphthoquinone, 2-hydroxy-1,4-naphthoquinone, and 1,4-anthraquinone.

The present embodiment is the same as Embodiment 1 in all other respects.

Even when the base oil and the like includes a compound having a branched hydrocarbon chain, these quinones do not accelerate deterioration of the refrigerating machine oil and the like. As a result of this, the reliability of the refrigeration cycle device and compressor can be further improved. Hereinafter, the details of the present embodiment will be described.

A hydrocarbon chain having a branched chain that may be included in base oil and the like has at least one tertiary carbon. The tertiary carbon tends to be more easily oxidized compared to the secondary carbon, and therefore, oxidation easily proceeds. Here, the oxidation reaction by 1,4-benzoquinone is shown in formula (9), using 3-ethylpentane as an example of the hydrocarbon chain structure having at least one tertiary carbon.

[Formula 9]

(9)

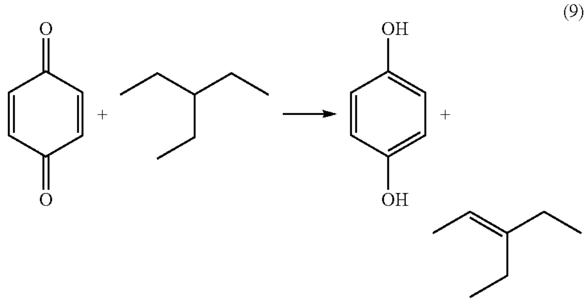

Here, 3-ethylpentane is listed as a simplified structure of the branched hydrocarbon chain structure that organic compounds such as refrigerating machine oil and polyester insulating film have. However, 3-ethylpentane is an example, and the branched chain of the branched hydrocarbon chain is not limited to two carbon atoms.

Specific examples of the branched hydrocarbon chain structure that may be present in the refrigerant circuit include a structure derived from a fatty acid constituting a polyol ester oil (such as isobutyric acid, 2-ethylhexanoic acid, and 3,5,5-trimethylhexanoic acid), a hydrocarbon chain constituting an alkylbenzene oil and an alkylnaphthalene oil, a side chain of a polyvinyl ether oil (such as $-O-CH_2-CH(-CH_3)_2$), a hydrocarbon chain of a mineral oil, a hydrocarbon chain of a polyalkylene glycol oil, and a structure derived from a diol constituting a polyester (such as 1,4-cyclohexanedimethanol).

When the reaction of formula (9) forms a C═C bond in the hydrocarbon chain of organic compounds such as refrigerating machine oil and polyester, there is a risk that high reactivity of the C═C bond will cause the organic compounds to react with oxygen and other substances mixed in the refrigerant circuit in a chain reaction, resulting in deterioration. In addition, when a refrigerant including R-13I1 is used, there is a risk that the radicals produced by the decomposition of R-13I1 will be added to the C═C bond, radicalizing the organic compounds, and causing them to be polymerized and turned into sludge through a chain reaction.

The heat of reaction of formula (9) for 1,4-benzoquinone is −41.6 kJ/mol, which means that the reaction is an exothermic reaction. Since the refrigerating machine oil and insulating film in the compressor are exposed to a high temperature, when formula (9) is an exothermic reaction, the reaction may proceed spontaneously as the system exceeds its activation energy due to the high temperature.

For the above 11 quinones, the heat of reaction of the oxidation reaction of 3-ethylpentane by the quinones was calculated. The calculation results are shown in Table 5. Note that the calculation conditions are the same as those described above as "conditions for calculation by the density functional theory".

TABLE 5

(Heat of reaction of oxidation reaction of 3-ethylpentane by quinones)

| Compound name | Heat of reaction [kJ/mol] |
|---|---|
| 1,4-Benzoquinone | −41.6 |
| 1,2-Benzoquinone | −65.4 |
| 2-Methyl-1,4-benzoquinone | −28.0 |
| 2-Phenyl-1,4-benzoquinone | −41.9 |
| 2-tert-Butyl-1,4-benzoquinone | −27.7 |
| 1,4-Naphthoquinone | 13.6 |
| 1,2-Naphthoquinone | −2.38 |
| 2,6-Naphthoquinone | −74.5 |
| 2-Hydroxy-1,4-naphthoquinone | 66.3 |
| 9,10-Anthraquinone | 82.3 |
| 1,4-Anthraquinone | 31.8 |
| Phenanthrenequinone | 22.7 |

From Table 5, it can be seen that, among the 11 quinones, the quinones for which the heat of reaction of the oxidation reaction of 3-ethylpentane is not an exothermic reaction are 1,4-naphthoquinone, 1,2-naphthoquinone, 2-hydroxy-1,4-naphthoquinone, 9,10-anthraquinone, 1,4-anthraquinone, and phenanthrenequinone.

These quinones do not oxidize branched hydrocarbon chains that organic compounds in the refrigerant circuit have, and thus do not accelerate the deterioration of compounds having branched hydrocarbon chains. This means that, even when these quinones are added to a refrigerating machine oil having a tertiary carbon, they do not accelerate deterioration of the refrigerating machine oil.

Here, the results of the above three tables, Table 1, Table 2, and Table 5, are summarized in Table 6.

TABLE 6

| Compound name | Effect of capturing decomposition product ($CF_3$) of R-13I1 | Effect of suppressing hydrogen embrittlement of neodymium magnet | Branched hydrocarbon oxidation reactivity |
|---|---|---|---|
| 1,4-Benzoquinone | High (good) | High (good) | High |
| 1,2-Benzoquinone | High (good) | High (good) | High |
| 2-Methyl-1,4-benzoquinone | High (good) | High (good) | High |
| 2-Phenyl-1,4-benzoquinone | High (good) | High (good) | High |
| 2-tert-Butyl-1,4-benzoquinone | High (good) | High (good) | High |
| 1,4-Naphthoquinone | High (good) | High (good) | Low (good) |
| 1,2-Naphthoquinone | High (good) | High (good) | High |
| 2,6-Naphthoquinone | High (good) | High (good) | High |
| 2-Hydroxy-1,4-naphthoquinone | High (good) | Low | Low (good) |
| 9,10-Anthraquinone | Low | Low | Low (good) |
| 1,4-Anthraquinone | High (good) | High (good) | Low (good) |
| Phenanthrenequinone | Low | High (good) | Low (good) |

From Table 6, it can be seen that, among the quinone additives used in Embodiment 1 that are highly effective in capturing the decomposition products of R-13I1, the quinones that do not accelerate the deterioration of branched hydrocarbon chains of organic compounds, which is a side effect, are 1,4-naphthoquinone, 2-hydroxy-1,4-naphthoquinone, and 1,4-anthraquinone.

Accordingly, when at least any of 1,4-naphthoquinone, 2-hydroxy-1,4-naphthoquinone, and 1,4-anthraquinone is added to the refrigerating machine oil, in addition to the effect of Embodiment 1, it is possible to suppress the acceleration of deterioration of branched hydrocarbon chains of organic compounds and to provide a refrigeration cycle device with high reliability.

Note that, from Table 6, it is preferable that the quinone additive compounded in the refrigerating machine oil be at least one selected from the group consisting of 1,4-naphthoquinone and 1,4-anthraquinone when the compressor comprises a rotor having a neodymium magnet. In this case, in addition to the effect of the present embodiment, the effect of suppressing embrittlement of the neodymium magnet can also be obtained, as in Embodiment 2.

In addition, even quinones not exemplified in the above Embodiments 1 to 4 are considered to have the same effects as the quinones exemplified in the above Embodiments as long as they are compounds that satisfy the conditions indicated in the above Embodiments.

EXAMPLES

Hereinafter, the present disclosure will be specifically described with reference to Examples, but the technical scope of the present disclosure is not limited to them.

Evaluation Test

Evaluation test was carried out to actually confirm the effect according to each of the above Embodiments. Specifically, using a refrigerating machine oil to which 1,4-naphthoquinone had been added, a metal member deterioration test was carried out.

The metal member deterioration test was an autoclave test and was carried out in accordance with JIS K2211:2009 (Annex C). The autoclave test is a type of chemical stability testing method for refrigerants. Specifically, it was performed by the procedures as described below.

The refrigerating machine oil and a sample are placed in a test container, which is sealed, depressurized, and then injected with a refrigerant. Next, the sealed test container is heated at 125 to 200° C. for a certain period of time, and the chemical stability of the sample is evaluated by the color of the sample and other factors.

In the metal member deterioration test, the sample, the refrigerating machine oil (15 g), and the refrigerant (15 g) were enclosed in a 50 $cm^3$ test container (portable reactor manufactured by Taiatsu Techno Corporation). Note that the reason for enclosing the refrigerating machine oil is, since the refrigerant is in a state mixed with the refrigerating machine oil inside the compressor, to simulate such a state.

The refrigerant used was R-13I1 (manufactured by Taiyo Nippon Sanso Corporation).

A commercially available polyol ester reagent (product code 320-65295 manufactured by FUJIFILM Wako Pure Chemical Corporation) was used as the base oil of the refrigerating machine oil.

In addition to the base oil, the refrigerating machine oil contains 0.5% by mass of 2,6-di-tert-butyl-4-methylphenol as an antioxidant (product code 023-07395 manufactured by FUJIFILM Wako Pure Chemical Corporation), 2.0% by mass of 2-ethylhexyl glycidyl ether as an acid scavenger (product code 329-7425 manufactured by FUJIFILM Wako Pure Chemical Corporation), and 2.0% by mass of tricresyl phosphate as an extreme pressure agent (anti-wear agent) (product code P0273 manufactured by Tokyo Chemical Industry Co., Ltd.). The formulation of refrigerating machine oil (not including quinone additive) at this point is defined as formulation 1.

Then, 1,4-naphthoquinone was compounded in the refrigerating machine oil as a quinone additive in an amount of 0.5% by mass (formulation 2), 1.0% by mass (formulation 3), 2.0% by mass (formulation 4), 3.0% by mass (formulation 5), or 4.0% by mass (formulation 6) relative to the mass of the refrigerating machine oil. A commercially available reagent (product code N0040 manufactured by Tokyo Chemical Industry Co., Ltd.) was used as 1,4-naphthoquinone.

In addition, the moisture in the refrigerating machine oil was removed by molecular sieves (133-0865 manufactured by FUJIFILM Wako Pure Chemical Corporation) so that the moisture content of the refrigerating machine oil was less than 50 ppm.

Note that, in the test container, 15 g of the refrigerating machine oil was sealed after compounding 1,4-naphthoquinone and removing the moisture.

Furthermore, a different metal member was enclosed in the test container for each test.

In Test 1, a neodymium magnet (a single magnet of 0.910 g that includes aluminum, silicon, and magnesium and has a film not including phosphorus) was enclosed.

In Test 2, aluminum rods, iron rods, and copper rods (two rods each with a diameter of 1.5 mm and a length of 50 mm) were enclosed.

In Test 3, aluminum rods, iron rods, and brass (C2700) rods (two rods each with a diameter of 1.5 mm and a length of 50 mm) were enclosed.

In Test 1, the test container was opened after heating, and measurement of the mass of the neodymium magnet was carried out. For the measurement of the mass of the neodymium magnet, the lumped neodymium magnet was taken out of the test container after heating, and measurement of the mass of the lumped neodymium magnet that had been taken out was carried out using an electronic balance (AP125WD manufactured by Shimadzu Corporation). Note that, since part or all of the neodymium magnet may be powdered, the value obtained by dividing the mass of the lumped neodymium magnet by the mass of the neodymium magnet before the test was defined as the mass retention rate of the neodymium magnet.

In Test 2, the test container was opened after heating, and observation of the appearance of the copper rods, measurement of the amount of R-23 in the refrigerant, and measurement of the amount of iodide ions in the refrigerating machine oil were carried out. When quantifying R-23 in the refrigerant, the concentration of R-23 relative to R-13I1 was measured using a gas chromatograph-mass spectrometer (JMS-K9 manufactured by JEOL Ltd.) and the R-23 production amount ratio was determined based on the results of formulation 1. The concentration of iodide ions in the refrigerating machine oil was quantified using an ion chromatography system (ICS-1600 manufactured by Dionex).

In Test 3, the test container was opened after heating, and observation of the appearance of the brass rods, measurement of the amount of R-23 in the refrigerant, and measurement of the amount of iodide ions and the amount of Zn in the refrigerating machine oil were carried out. When quantifying R-23 in the refrigerant, the concentration of R-23 relative to R-13I1 was measured using a gas chromatograph-mass spectrometer (JMS-K9 manufactured by JEOL Ltd.) and the R-23 production amount ratio was determined based on the results of formulation 1. The concentration of iodide ions in the refrigerating machine oil was quantified using an ion chromatography system (ICS-1600 manufactured by Dionex). The amount of Zn in the refrigerating machine oil was quantified using an inductively coupled plasma emission spectrometer (SPS3100 manufactured by SII NanoTechnology Inc.).

In the metal member deterioration test, the test container in which the sample, the refrigerating machine oil, and the refrigerant had been enclosed was heated to a temperature of 140° C. using an oven (SPH-201S manufactured by ESPEC Corp.). The heating time was 336 hours for Test 1 and 72 hours for Test 2 and Test 3. The test results are shown in Table 7.

TABLE 7

| | | Additive | | | | | |
|---|---|---|---|---|---|---|---|
| | | Formulation 1 | Formulation 2 | Formulation 3 | Formulation 4 | Formulation 5 | Formulation 6 |
| | | Amount of 1,4-naphthoquinone [% by mass] | | | | | |
| | | 0 | 0.5 | 1 | 2 | 3 | 4 |
| Test 1 | Mass retention rate of neodymium magnet [%] | Powdered | 100 | 100 | 100 | 100 | 100 |
| Test 2 | Change in copper rod luster | Changed | No change | No change | No change | No change | No change |
| | R-23 production amount ratio | 1 | 0.03 | 0.005 | 0.005 | 0.004 | 0.004 |
| | Concentration of iodide ions in oil [μg/g] | 43 | <20 | <20 | <20 | <20 | <20 |
| Test 3 | Change in brass rod luster | Changed | No change | No change | No change | No change | No change |
| | R-23 production amount ratio | 1 | 0.1 | 0.03 | 0.001 | 0.001 | 0.001 |
| | Concentration of iodide ions in oil [μg/g] | 71 | <20 | <20 | <20 | <20 | <20 |
| | Concentration of Zn in oil [μg/g] | 56 | <1 | <1 | <1 | <1 | <1 |

As a result of Test 1, it was unable to measure the mass of the neodymium magnet because the neodymium magnet in formulation 1 turned into a powdery form and the lumped neodymium magnet could not be collected.

In contrast, in formulation 2 to formulation 6, it was possible to collect the lumped neodymium magnet and its mass remained unchanged.

This is thought to be the effect due to the fact that 1,4-naphthoquinone in the refrigerating machine oil captured the decomposition products of R-13I1 ($CF_3$. and I.), thereby suppressing the deterioration reaction of the neodymium magnet due to HI, and 1,4-naphthoquinone captured the hydrogen molecule generated in the container, thereby suppressing the hydrogen embrittlement of the neodymium magnet.

As a result of Test 2, the surface of the copper rods in formulation 1 lost its luster and whitening proceeded. In addition, iodide ions were detected in the refrigerating machine oil at a concentration of 43 μg/g. The surface of the copper rods that had lost its luster was observed using a scanning electron microscope (SU8000 manufactured by Hitachi High-Technologies Corporation) equipped with an energy dispersive X-ray analyzer (EMAX ENERGY EX-250 manufactured by HORIBA, Ltd.), and as a result, found to be covered with a solid from which iodine (I) was detected.

In contrast, in formulation 2 to formulation 6, the luster of the surface of the copper rods was maintained, the amount of R-23 produced was reduced, and iodide ions were not detected in the refrigerating machine oil.

This is thought to be due to the fact that 1,4-naphthoquinone in the refrigerating machine oil captured the decomposition products of R-13I1 ($CF_3$. and I.), thereby suppressing the deterioration reaction of copper, the reaction of producing R-23, and the reaction of producing HI.

As a result of Test 3, the surface of the brass rods in formulation 1 lost its luster and whitening proceeded. In addition, iodide ions and Zn were detected in the refrigerating machine oil at 71 μg/g and 56 μg/g, respectively. The surface of the brass rods that had lost its luster was observed using a scanning electron microscope equipped with an energy dispersive X-ray analyzer, and as a result, found to be covered with a solid from which iodine (I) was detected.

In contrast, in formulation 2 to formulation 6, the luster of the surface of the brass rods was maintained, the amount of R-23 produced was reduced, and iodide ions and Zn were not detected in the refrigerating machine oil.

This is thought to be due to the fact that 1,4-naphthoquinone in the refrigerating machine oil captured the decomposition products of R-13I1 ($CF_3$. and I.), thereby suppressing the deterioration reaction of copper in brass, the leaching reaction of Zn in brass, the reaction of producing R-23, and the reaction of producing HI.

Note that, except for the powdered neodymium magnet, no contaminant was found in the refrigerating machine oil after testing in Test 1 to Test 3. This is thought to be because 1,4-naphthoquinone did not cause the acceleration of deterioration of hydrocarbon chains of organic compounds, which is a side effect of quinones.

As described above, the inclusion of 1,4-naphthoquinone in the refrigerating machine oil can suppress the deterioration reaction of metals in the refrigerant circuit, the reaction of producing R-23, and the reaction of producing HI, maintain the performance of the compressor, and maintain the performance of the refrigeration cycle device.

In addition, from the results of Table 8, the ratio of the amount of 1,4-naphthoquinone included in the refrigerating machine oil to the mass of the refrigerating machine oil is preferably 0.5 to 4% by mass, and from the viewpoint of the effect of suppressing production of R-23, it is thought to be more preferably 1 to 4% by mass.

The embodiments disclosed here should be considered merely illustrative and not restrictive in all respects. The scope of the present disclosure is presented by the claims rather than the description given above, and it is intended that all modifications within the meaning and scope equivalent to the claims be included.

REFERENCE SIGNS LIST

1 compressor, 2 condenser, 3 expansion valve, 4 evaporator, 5 refrigerant circuit, 5*a* to 5*d* refrigerant pipings, 6 condenser blower, 7 evaporator blower, 8 shell, 9 compression mechanism, 10 suction pipe, 11 discharge pipe, 12 shaft, 13 oil reservoir, 17 rotor, 18 stator, 43 rotor core, 43*a* magnet insertion holes, 43*b* refrigerant passage holes, 43*c* shaft hole, 44 magnets, 45 film, 100 refrigeration cycle device.

The invention claimed is:

1. A refrigeration cycle device comprising:

a refrigerant;

a compressor that compresses the refrigerant; and a refrigerating machine oil that lubricates a sliding part of the compressor, wherein the compressor comprises a rotor having a neodymium magnet, the refrigerant includes trifluoroiodomethane, the refrigerating machine oil includes a base oil and a quinone additive, and the quinone additive is at least one selected from the group consisting of 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, 2-hydroxy-1,4-naphthoquinone, and 1,4-anthraquinone.

2. The refrigeration cycle device according to claim 1, wherein the quinone additive is at least one selected from the group consisting of 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, and 1,4-anthraquinone.

3. The refrigeration cycle device according to claim 2, wherein the quinone additive is at least one selected from the group consisting of 1,4-naphthoquinone, 1,2-naphthoquinone, and 1,4-anthraquinone.

4. The refrigeration cycle device according to claim 2, wherein the quinone additive is at least one selected from the group consisting of 1,4-naphthoquinone and 1,4-anthraquinone.

5. The refrigeration cycle device according to claim 1, wherein the quinone additive is at least one selected from the group consisting of 1,4-naphthoquinone, 1,2-naphthoquinone, 2-hydroxy-1,4-naphthoquinone, and 1,4-anthraquinone.

6. The refrigeration cycle device according to claim 1, wherein the quinone additive is at least one selected from the group consisting of 1,4-naphthoquinone, 2-hydroxy-1,4-naphthoquinone, and 1,4-anthraquinone.

7. The refrigeration cycle device according to claim 1, wherein a proportion of an amount of the quinone additive included in the refrigerating machine oil to an amount of the refrigerating machine oil is 0.1% by mass or more and 10% by mass or less.

8. A compressor used for a refrigeration cycle device, wherein the refrigeration cycle device comprises a refrigerant that includes trifluoroiodomethane, the compressor comprises a rotor having a neodymium magnet, the compressor includes a refrigerating machine oil for lubricating a sliding part of the compressor, the refrigerating machine oil includes a base oil and a quinone additive, and the quinone additive is at least one selected from the group consisting of 1,4-benzoquinone, 1,2-benzoquinone, 2-methyl-1,4-benzoquinone, 2-phenyl-1,4-benzoquinone, 2-tert-butyl-1,4-benzoquinone, 1,4-naphthoquinone, 1,2-naphthoquinone, 2,6-naphthoquinone, 2-hydroxy-1,4-naphthoquinone, and 1,4-anthraquinone.

* * * * *